US007542884B2

(12) United States Patent
Boris et al.

(10) Patent No.: US 7,542,884 B2
(45) Date of Patent: Jun. 2, 2009

(54) SYSTEM AND METHOD FOR ZERO LATENCY, HIGH FIDELITY EMERGENCY ASSESSMENT OF AIRBORNE CHEMICAL, BIOLOGICAL AND RADIOLOGICAL THREATS BY OPTIMIZING SENSOR PLACEMENT

(75) Inventors: Jay P Boris, Falls Church, VA (US); Keith S Obenschain, Burke, VA (US); Gopal Patnaik, Silver Spring, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 423 days.

(21) Appl. No.: 11/279,452

(22) Filed: Apr. 12, 2006

(65) Prior Publication Data
US 2007/0038383 A1 Feb. 15, 2007

(51) Int. Cl.
*G06F 17/50* (2006.01)
*G06G 7/48* (2006.01)

(52) U.S. Cl. .................. 703/2; 703/7; 703/12; 702/19; 345/30

(58) Field of Classification Search .................. 703/2, 703/12, 6, 7; 702/3, 19; 345/30
See application file for complete search history.

(56) References Cited

U.S. PATENT DOCUMENTS

| H002208 H | * | 1/2008 | Stytz et al. ..................... 703/12 |
| 2002/0169557 A1 | * | 11/2002 | Gilbert et al. .................. 702/3 |
| 2005/0004823 A1 | * | 1/2005 | Hnatio .......................... 705/7 |

* cited by examiner

*Primary Examiner*—Thai Phan
(74) *Attorney, Agent, or Firm*—John Karasek; John L. Young

(57) ABSTRACT

Networked groups of sensors that detect Chemical, Biological, and Radiological (CBR) threats are being developed to defend cities and military bases. Due to the high cost and maintenance of these sensors, the number of sensors deployed is limited. It is vital for the sensors to be deployed in optimal locations for these sensors to be effectively used to analyze the scope of the threat. A genetic algorithm, along with instantaneous plume prediction capabilities meets these goals. An analyzer's time dependant plumes, upwind danger zone, and sensor capabilities are used to determine the fitness of sensor networks generated by the genetic algorithm.

9 Claims, 13 Drawing Sheets

Chemical Release in An Urban Environment

Chemical Release in An Urban Environment

SYSTEM AND METHOD FOR ZERO LATENCY, HIGH FIDELITY EMERGENCY ASSESSMENT OF AIRBORNE CHEMICAL, BIOLOGICAL AND RADIOLOGICAL THREATS BY OPTIMIZING SENSOR PLACEMENT

FIELD OF THE INVENTION

The invention is concerned with a first responder system for predictively modeling contaminant transport during an environmental threat or a Chemical, Biological, or Radiological (CBR) threat or obscurant threat and for effective response after the threat.

DESCRIPTION OF THE PRIOR ART

The effective defense of cities, large bases, and military forces against chemical, biological, or radiological (CBR) incidents or attack requires new prediction/assessment technology to be successful. The existing plume prediction technology in use in much of the nation is based on Gaussian similarity solutions ("puffs" or "plumes"), an extended Lagrangian approximation that only really applies for large regions and flat terrain where large-scale vortex shedding from buildings, cliffs, or mountains is absent. These current plume methods are also not designed for terrorist situations where the input data about the source (or sources) is very scant and the spatial scales are so small that set-up, analysis and situation assessment of a problem must take place in seconds to be maximally effective. Both greater speed and greater accuracy are required.

The CBR defense of a fixed site or region has a number of important features that make it different from the predictive simulation of a contaminant plume from a known set of initial conditions. The biggest difference is that very little may be known about the source, perhaps not even its location. Therefore any analysis methods for real-time response cannot require this information. It is a crucial requirement to be able to use anecdotal information, qualitative data, and any quantitative sensor data we may be lucky enough to have and instantly build a situation assessment suitable for immediate action.

A software emergency assessment tool should be effectively instantaneous and easy to use because we require immediate assessment of new data, instantaneous computation of exposed and soon-to-be exposed regions, and the zero-delay evaluations of options for future actions. The software should also be capable of projecting optimal evacuation paths based on the current evolving situation assessment.

To meet these requirements, a new tool is required that is much faster than current "common use" models with accuracy comparable to three-dimensional, physics-based flow simulations for scenarios involving complex and urban landscapes. The focus is on situation assessment through sensor fusion of qualitative and incomplete data.

Typical hazard prediction and consequence assessment systems have at their heart a plume simulation model based on a Gaussian plume/puff model. These systems typically employ Gaussian plume simulation models and require accurate velocity fields as input. The Gaussian plume method, while relatively fast, tends to be inaccurate, especially for urban areas. The setup for all these systems tends to be complicated, and require a-priori knowledge of the source characteristics.

Some examples of common-use hazard prediction and assessment systems are as follows:

CATS (Consequences Assessment Tool Set) is a consequence management tool package, developed by the U.S. Defense Threat Reduction Agency, U.S. Federal Emergency management Agency, and Science Applications International Corp, that integrates hazard prediction, consequence assessment, emergency management tools, including the Hazard Prediction and Assessment Capability (HPAC) system, and critical population and infrastructure data within a commercial Geographical Information System. (CATS: Consequences Assessment Tool Set, U.S. Defense Threat Reduction Agency, U.S. Federal Emergency management Agency, and Science Applications International Corp.; SWIATEK et al. "Crisis Prediction Disaster Management, SAIC Science and Technology Trends II, Jun. 24, 1999)

CAMEO® (Computer Aided Management of Emergency Operations) is a system of software applications used widely to plan for and respond to chemical emergencies. It is one of the tools developed by EPA's Chemical Emergency Preparedness and Prevention Office (CEPPO) and the National Oceanic and Atmospheric Administration Office of Response and Restoration (NOAA), to assist front-line chemical emergency planners and responders. (CAMEO®: Computer Aided Management of Emergency Operations, EPA's Chemical Emergency Preparedness and Prevention Office (CEPPO) and NOAA; CAMEO "Computer Aided Management of Emergency Operations," U.S. Environmental Protection Agency, May 2002, pp. 1-306)

MIDAS-AT™ (Meteorological Information and Dispersion Assessment System—Anti-Terrorism), a product of ABS Consulting Inc. is the all-in-one software technology that models dispersion of releases of industrial chemicals, chemical and biological agents, and radiological isotopes caused by accidents or intentional acts. MIDAS-AT is designed for use during emergencies and for planning emergency response drills. Its Graphical User Interface (GUI) is designed for straightforward user entry of information required to define a terrorist scenario with enough detail to provide critical hazard information during the incident. (MIDAS-AT™: Meteorological Information and Dispersion Assessment System—Anti-Terrorism: ABS Consulting)

HPAC (Hazard Prediction and Assessment Capability), developed by Defense Threat Reduction Agency, is a forward-deployable, counter proliferation-counterforce collateral assessment tool. It provides the means to predict the effects of hazardous material releases into the atmosphere and its impact on civilian and military populations. It models nuclear, biological, chemical, radiological and high explosive collateral effects resulting from conventional weapon strikes against enemy weapons of mass destructions production and storage facilities. The HPAC system also predicts downwind hazard areas resulting from a nuclear weapon strike or reactor accident and has the capability to model nuclear, chemical and biological weapon strikes or accidental releases. (HPAC: Hazard Prediction and Assessment Capability, DTRA, HPAC Version 2.0 and HASCAL/SCIPUFF Users Guide, Defense Special Weapons Agency, July 1996; "Hazard Prediction and Assessment Capability" Fact Sheet, Defense Threat Reduction Agency Public Affairs, pp. 1-2)

VLSTRACK (Vapor, Liquid, and Solid Tracking), developed by Naval Surface Warfare Center, provides approximate downwind hazard predictions for a wide range of chemical and biological agents and munitions of military interest. The program was developed to be user-friendly and features smart input windows that check input parameter combinations to ensure that a reasonable attack is being defined, and simple and informative output graphics that display the hazard footprint for agent deposition, dosage, or concentration. The model also features variable meteorology, allowing for interfacing the attack with a meteorological forecast; this feature is very important for biological and secondary evaporation computations. (VLSTRACK: Vapor, Liquid, and Solid Tracking, [U.S. Pat. No. 5,648,914] Naval Surface Warfare Center, Bauer, T. J. and R. L. Gibbs, 1998. NSWCDD/TR-98/62, "Software User's Manual for the Chemical/Biological Agent Vapor, Liquid, and Solid Tracking (VLSTRACK) Computer Model, Version 3.0," Dahlgren, Va.: Systems Research and Technology Department, Naval Surface Warfare Center.)

ALOHA (Areal Locations of Hazardous Atmospheres), from EPA/NOAA and a component of CAMEO, is an atmospheric dispersion model used for evaluating releases of hazardous chemical vapors. ALOHA allows the user to estimate the downwind dispersion of a chemical cloud based on the toxicological/physical characteristics of the released chemical, atmospheric conditions, and specific circumstances of the release. Graphical outputs include a "cloud footprint" that can be plotted on maps to display the location of other facilities storing hazardous materials and vulnerable locations, such as hospitals and schools. (ALOHA®—Areal Locations of Hazardous Atmospheres, EPA/NOAA; "ALOHA Users Manual", Computer Aided Management of Emergency Operations, August 1999, pp. 1-187)

FASTD-CT (FAST3D—Contaminant Transport) is a time-accurate, high-resolution, complex geometry computational fluid dynamics model developed by the Naval Research Laboratory in the Laboratory for Computational Physics and Fluid Dynamics. The fluid dynamics is performed with a fourth-order accurate implementation of a low-dissipation algorithm that sheds vortices from obstacles as small one cell in size. Particular care has been paid to the turbulence treatments since the turbulence in the urban canyons lofts ground-level contaminant up to where the faster horizontal airflow can transport it downward. FAST3D-CT has a number of physical processes specific to contaminant transport in urban areas such as solar chemical degradation, evaporation of airborne droplets, re-lofting of particles and ground evaporation of liquids. (FAST3D-CT: FAST3D—Contaminant Transport, LCP & FD, NRL Boris, J. "The Threat of Chemical and Biological Terrorism: Preparing a Response," Computing in Science & Engineering, pp. 22-32, March/April 2002.)

NARAC (National Atmospheric Release Advisory Center) maintains a sophisticated Emergency Response System at its facility at Lawrence Livermore National Laboratory. The NARAC emergency response central modeling system consists of a coupled suite of meteorological and dispersion models that are more sophisticated than typical Gaussian models. Users access this system using a wide variety of tools, also supplied by NARAC. With this system NARAC provides an automated product for almost any type of hazardous atmospheric release anywhere in the world. Users must initiate a problem through a phone call to their operations staff or interactively via computer. NARAC will then execute sophisticated 3-D models to generate the requested products that depict the size and location of the plume, affected population, health risks, and proposed emergency responses. (NARAC: Atmospheric Release Advisory Capability, Lawrence Livermore National Laboratory, "Forewarning of Coming Hazards," Science & Technology Review, pp. 4-11, June 1999, Lawrence Livermore National Laboratory.)

State-of-the-art, engineering-quality 3D predictions such as FAST3D-CT or the NARAC Emergency Response System that one might be more inclined to believe can take hours or days to set up, run, and analyze.

All of the above-mentioned systems take several minutes, hours, or even days to return results. Simplified systems such as PEAC® (Palmtop Emergency Action for Chemicals [U.S. Pat. No. 5,724,255] originally developed by Western Research Institute provide the necessary emergency response information to make quick and informed decisions to protect response personnel and the public. PEAC-WMD 2002 provides in hand information compiled from a number of references with very fast recall. PEAC provides emergency responders with instant access to vital information from a number of sources and evacuation distances based on several sets of guidelines. This system, can return results within seconds, requires less detailed knowledge of the source, but the resulting fixed-shape plume does not take into account any effect of complex terrain or buildings.

Waiting even one or two-minutes for each approximate scenario computation can be far too long for timely situation assessment as in the current common-use hazard prediction systems. Overly simplified results can result in inaccurate results. The answer to this dilemma is to do the best computations possible from state-of-the-art 3D simulations well ahead of time and capture their salient results in a way that can be recalled, manipulated, and displayed instantly.

SUMMARY OF THE INVENTION

Greater accuracy and much greater speed are possible at the same time in an emergency assessment system for an environmental threat or airborne chemical biological and radiological (CBR) threats. The present invention is a portable, entirely graphical hazard prediction software tool that exploits the new dispersion nomograph technology in order to achieve its speed and accuracy. The Nomograph technology has been filed as a provisional application at the U.S. Patent and Trademark Office, provisional application No. 60/443,530 on Jan. 30, 2003. The use of the dispersion nomograph representation and processing algorithms also allow some new features not available in existing systems. Multiple sensor fusion for instantaneous situation assessment is an automatic consequence of the nomograph technology. Reports from sensors about a contaminant can used to determine the affected area downwind. Using three or four appropriate sensor readings, the present invention can also backtrack and locate an unknown source graphically with zero computational delay. The present invention can accept qualitative and anecdotal input and does not require knowledge of a source location or a source amount.

The present invention provides an easy to use graphical user interface (GUI) to manipulate sensor, source, or site properties (i.e. location) and immediately provides an updated display of potential CBR hazards from a contaminant plume. The implementation has fast forward and fast reverse for the plume envelope displays, direct sensor fusion, and the ability to vary environmental properties in mid scenario. The present invention also plots evacuation routes automatically. The capability appears to the user as an infinite library of scenarios with a graphical controller to select, morph, and manipulate the CBR scenarios directly.

With the development of networked chemical sensors, and their possible deployment in cities and bases, it is vital to deploy them in optimal locations to provide the most beneficial effect. The characteristics of a sensor network, and the placement of sensors within the network, need to be evaluated for performance for a given situation. A sensor network should be capable of minimizing the detection delay of a source release. This maximizes the response time of people within the effected area, allowing them to take the appropriate measures to limit their exposure to the release.

The costs and logistics of running, building, and maintaining a sensor network makes it difficult to provide zero detection delay if point detectors are used exclusively. While some delay may be tolerated, the present invention minimizes this delay within other constraints of the situation. To find an optimal sensor network, the present invention uses a genetic algorithm using features of the present invention is an attractive solution.

An approach using genetic algorithms was selected for sensor optimization because the characteristics making up a robust sensor network were largely unknown. This approach also made it easy to modify specific characteristics while leaving the search method intact. Furthermore, advances in contaminant transport modeling made it possible for this search technique to be utilized.

DETAILED DESCRIPTION OF THE PREFERRED EMBODIMENT

Figure 1:
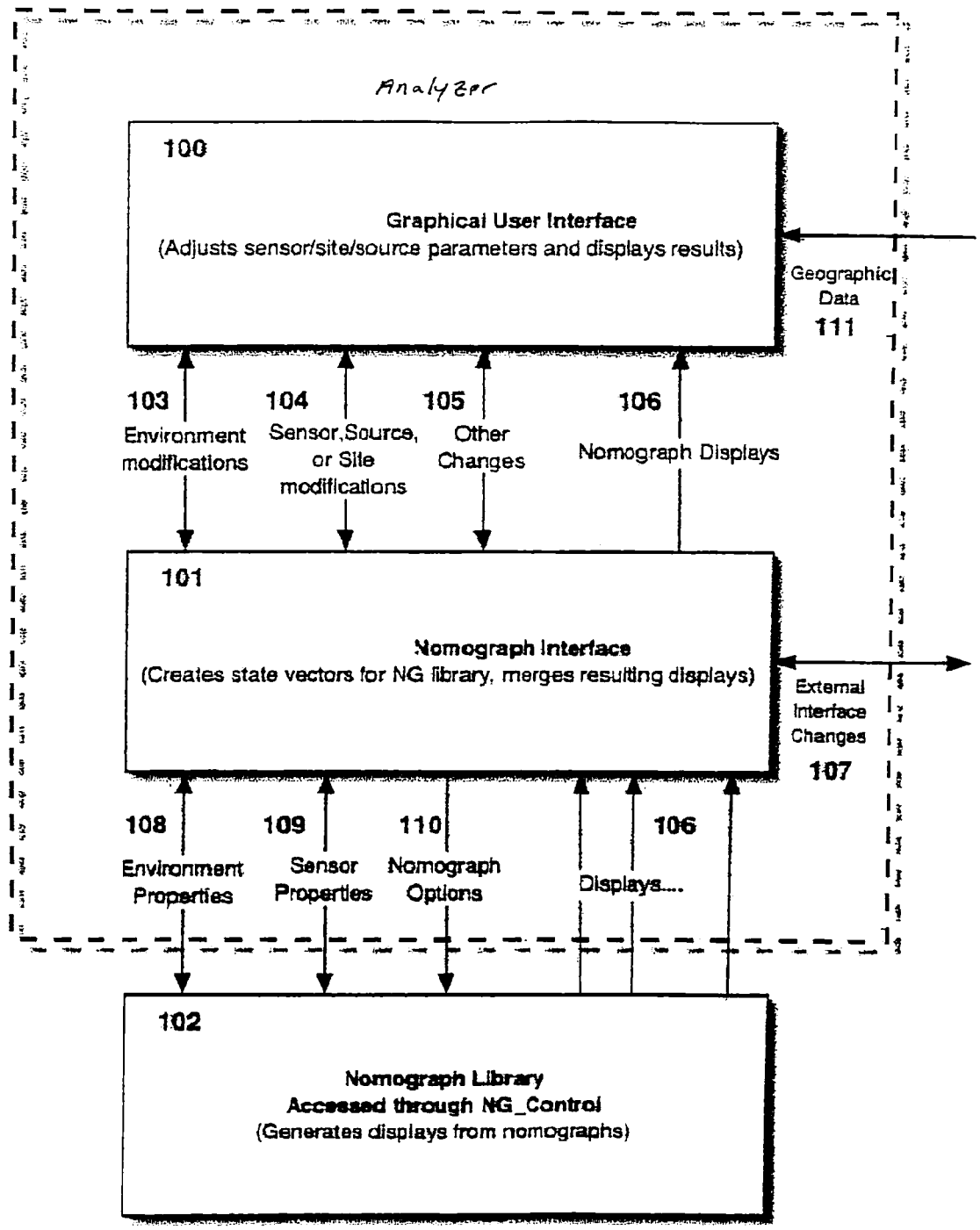
FIG. 1 is a block diagram showing the overall structure, and main components of the present invention.

Refer to FIG. 1 for the overall data flow of the invention. There are two main components to analyzer 1000, the Graphical User Interface (GUI) 100, and the Nomograph Interface 101. This modular configuration allows manipulation either from analyzer 1000, or an External Interface 107. This flexibility enables analyzer 1000 to be a stand-alone system or as a component of larger command and control system. This modular approach is used throughout analyzer 1000, which allows it to be flexible, robust, and easily extendable.

Nomograph Interface 101 translates from the data format used in GUI 100, and External Interface 107 to the data format used by a Nomograph Library 102. Within analyzer 1000, the properties of each sensor, source, and site (SSS) are represented as an object. An object is defined as the set of properties that comprise a sensor, source or site. The number of properties for each sensor, source, or site object may vary, depending on what type of sensor, source, or site the object represents. Each SSS is represented as a state vector in Nomograph Library 102. A state vector is defined as the properties Nomograph Library 102 uses for a sensor, source, or site to calculate a Nomograph Display 106. An object will always have a corresponding state vector. The SSS objects will include at a minimum the properties represented by its corresponding state vector. An object may be modified by: 1) user of GUI 100; 2) by an outside program, script, network, or other connection via External Interface 107; or 3) by the reconciliation of the properties between an object and its state vector counterpart after a new set of Nomograph displays has been generated. Similarly, an environment object exists that contains the overall properties used by Nomograph Library 102. Any changes 103-105 to a property of any object, made by External Interface 107, or GUI 100 are reported to Nomograph Interface 101. Depending on the object property changed, Nomograph Library 102 would be called, and new displays 106 would be generated. The change of a property of an object will send out a notification that the object has been changed to GUI 100, and to External Interface 107.

All SSS objects have the following properties, position of the object, and a property, which includes, or excludes the object from the generation of Nomograph Display 106.

Sensor objects typically represent external sensors 203 (sensor in external mode). A sensor object in external mode will have most of its properties determined by a connection to a real sensor via External Interface 107. The sensor state can be either hot or cold. A sensor in a hot state is defined as a sensor that has detected a contaminant at its location, while a sensor in a cold state has not. Sensor objects have all of the general properties of an object, along with additional properties depending on the type of sensor represented. This includes sensor modes, its current state, the timestamp of its last state change, the concentration, mass, type and other relevant properties of the contaminant detected. The additional sensor modes include manual, and simulation modes. A sensor object in manual mode has all of its properties determined by the user and are typically used for anecdotal reports entered by the user in GUI 100. In the simulation mode, a sensor's state is determined by the contaminant plume as determined by Nomograph Library 102. For example, sensors in simulation mode within the contaminant footprint will change its state from cold to hot, while a sensor in manual or external mode would not. Depending on the information provided by the external, or manual sensor, additional sensor states showing intermediate states between hot and cold might be represented by the sensor object. However, the additional sensor states would be translated into hot and cold states in the corresponding state vector depending on the sensitivity of the sensor network, and user preference. Multiple sensor objects could represent one real sensor. An example would be a mobile sensor taking sensor readings at fixed interval in time. Sensor objects can be grouped together. Examples of sensor groups include a sensor group for a fixed sensor network, and a sensor group for mobile sensors.

Source objects represent a contaminant release at a location. The number of properties can vary in a Source object. At a minimum, it has the general properties of a standard object. Additional properties can include the concentration, mass, type, and other relevant properties of the contaminant. These additional properties would increase the level of detail provided by Nomograph Displays 106, but are not required. Multiple source objects can be grouped together to form other types of contaminant releases. This includes line sources.

Site objects represent a region, or area of interest. A site object is used to provide detailed properties about that area. They are typically used to generate additional Nomograph displays 106 specifically pertaining to that site. A site object has the general properties of a standard object. Additional properties could include building parameters, or other relevant information used to protect that site.

An environmental object exists for analyzer 1000. The properties in an environmental object consist of temperature, time, season, wind speed, and direction, and other meteorological properties. These properties may be set by the user manually, or updated automatically via External Interface 107.

Nomograph Library 102 takes the SSS state vectors, and the environmental vector as input and outputs Nomograph displays 106. These state vectors only include the properties used to generate Nomograph display 106. Properties common to SSS state vectors are its position, and a flag that allows the vector to be excluded from the calculation of Nomograph Displays 106.

The sensor state vectors 109 consist of the current state, the timestamp of its last state change, its mode, the concentration, mass, type, and other relevant properties of the contaminant detected. Source state vector properties include the amount of contaminant released, timestamp of release, mass, type, and other relevant properties of the contaminant. Site state vectors contain the special properties pertaining to that site. The environmental state vector 108 consists of the time of day, season, current temperature, wind direction, and speed, and other meteorological properties.

The Nomograph Options 110 passed to Nomograph Library 102 include the requested size of Nomograph Display 106, the selected area of the Nomograph, and which set of Nomograph tables to be used in the generation of Nomograph Display 106.

Figure 2:
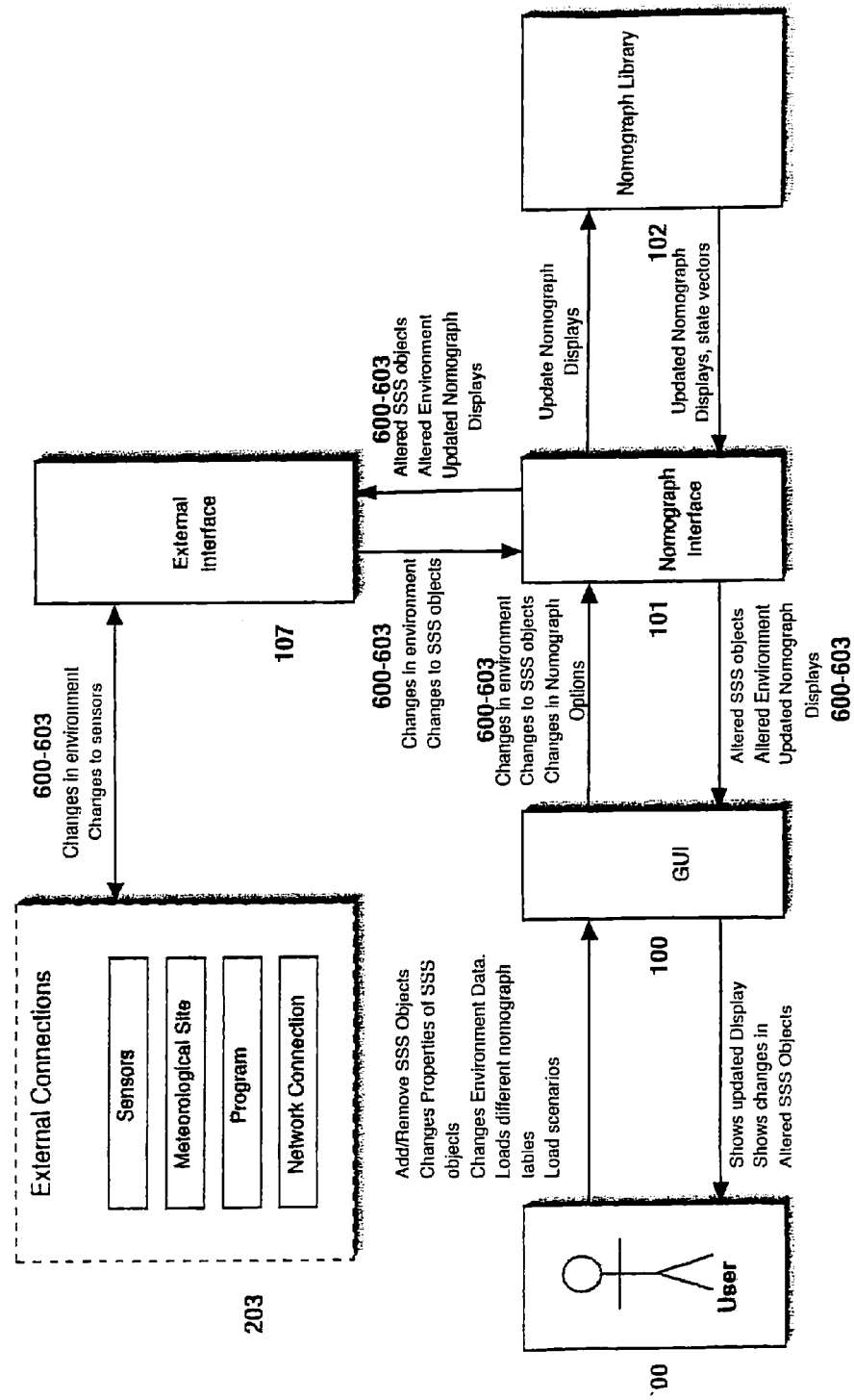
FIG. 2 is an Event Flow diagram illustrating how the components of the present invention respond to events generated internally, and externally.
Figure 6:
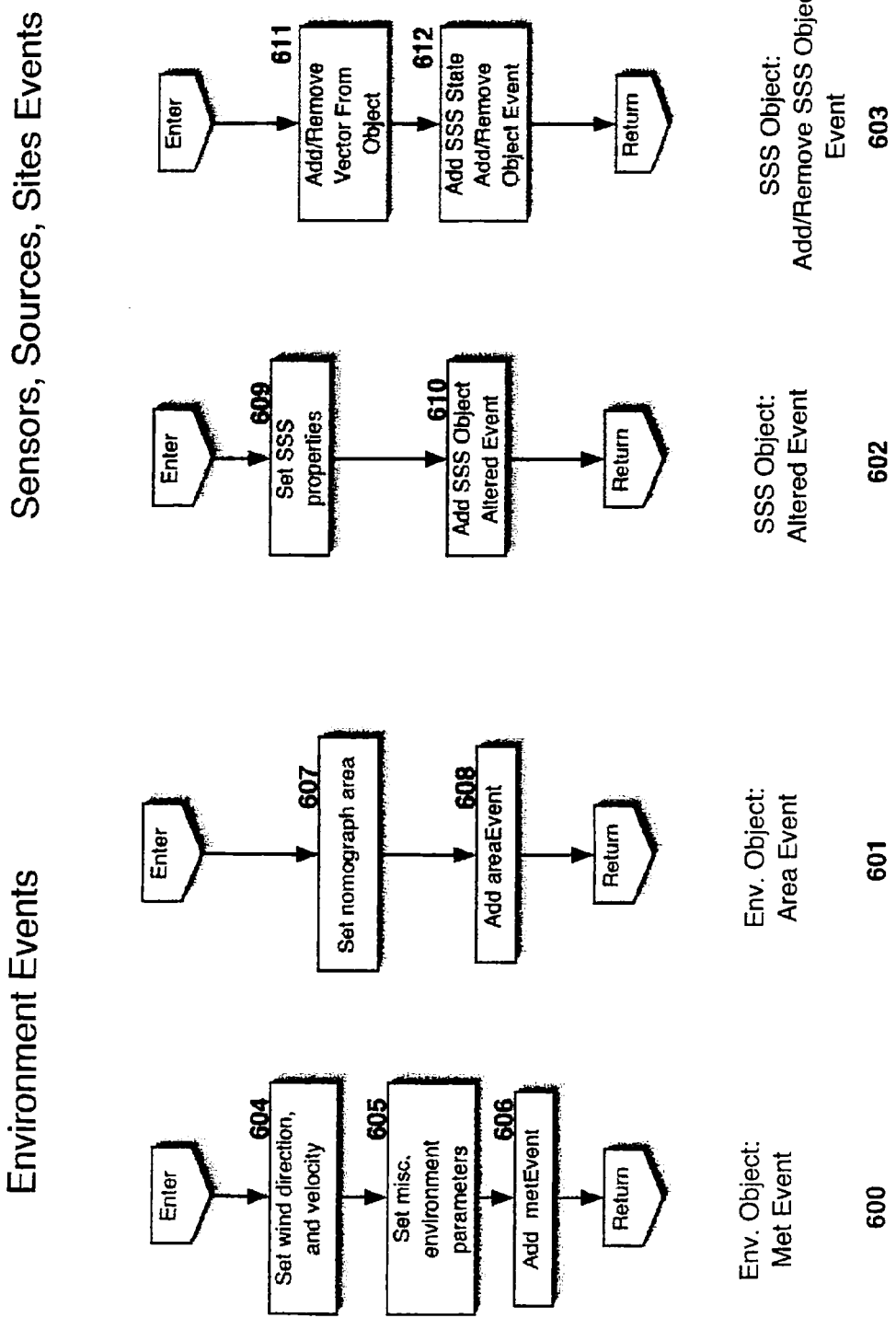
FIG. 6 is a block diagram of the various events generated externally, and internally in the present invention.

A more detailed description of the invention is found in FIG. 2 which depicts the event flow between GUI 100, External Interface 107, and Nomograph Interface 101. An event is defined as a notice communicated to a component of analyzer 1000 that an object, or a component of analyzer 1000 has been modified. Upon receipt of an event, the recipient will take the appropriate action. For example, if a user changes a manual sensor's state from cold to hot, the sensor object would post a SSS Altered event (FIG. 6, 602). This is received by Nomograph Interface 101, which calls Nomograph Library 102 to generate an updated Nomograph Display 106. Nomograph Interface 101 would then post an event notifying GUI 100 that an updated Nomograph Display 106 is available. If necessary, this change will be shown to a user. The use of events in analyzer 1000 allow for uniform handling of internal and external changes. This allows objects, and components of analyzer 1000 to synchronized regardless of the source of the change, internal or external.

Nomograph Interface 101 receives events from the components of analyzer 1000, and from all the objects in analyzer 1000. A change in a property of an object from any component of analyzer 1000 would be sent to Nomograph Interface 101. From this component, other objects and components would be notified of the change via events. Examples of actions from Nomograph Interface 101 that post events are: 1) a modification of an SSS object, or the environmental object by External Interface 107 or GUI 100, 2) modification of a SSS object, or the Environmental object after a reconciliation of an object with its corresponding state vector after the generation of an updated Nomograph Display 106. Depending on the type of event received, Nomograph Interface 101 will call Nomograph Library 102 to generate a new Nomograph Display 106, or will wait some period of time for more events to arrive before updating Nomograph Display 106.

GUI 100 posts events through actions of the user, and reacts to events from Nomograph Interface 101. Examples of user actions that generate events through GUI 100 are: 1) the addition or removal of SSS objects, 2) A modification of a property of an SSS object, 3) modification of properties in the Environment object, 4) saving/loading of SSS objects and the Environmental object from a storage device, 5) a change in how Nomograph Displays 106 are presented, 6) changing the set of nomograph tables used to generate Nomograph Displays 106. The events that GUI 100 reacts to are changes in the properties of SSS objects, changes to properties in the environment object, and updates to Nomograph Displays 106.

External Interface 107 posts events through changes to SSS objects, and the environment object via connections 203 to External Interface 107. External Connections 203 to External Interface 107 typically include sensors, meteorological information, an external program, or network connections. External Interface 107 reacts to events from Nomograph Interface 101. Examples of actions from External Interface 107 that generate events are: 1) modifying a property of a SSS objects, 2) modifying a property of the environmental object, 3) a generation of updated Nomograph Displays 106.

Figure 3:
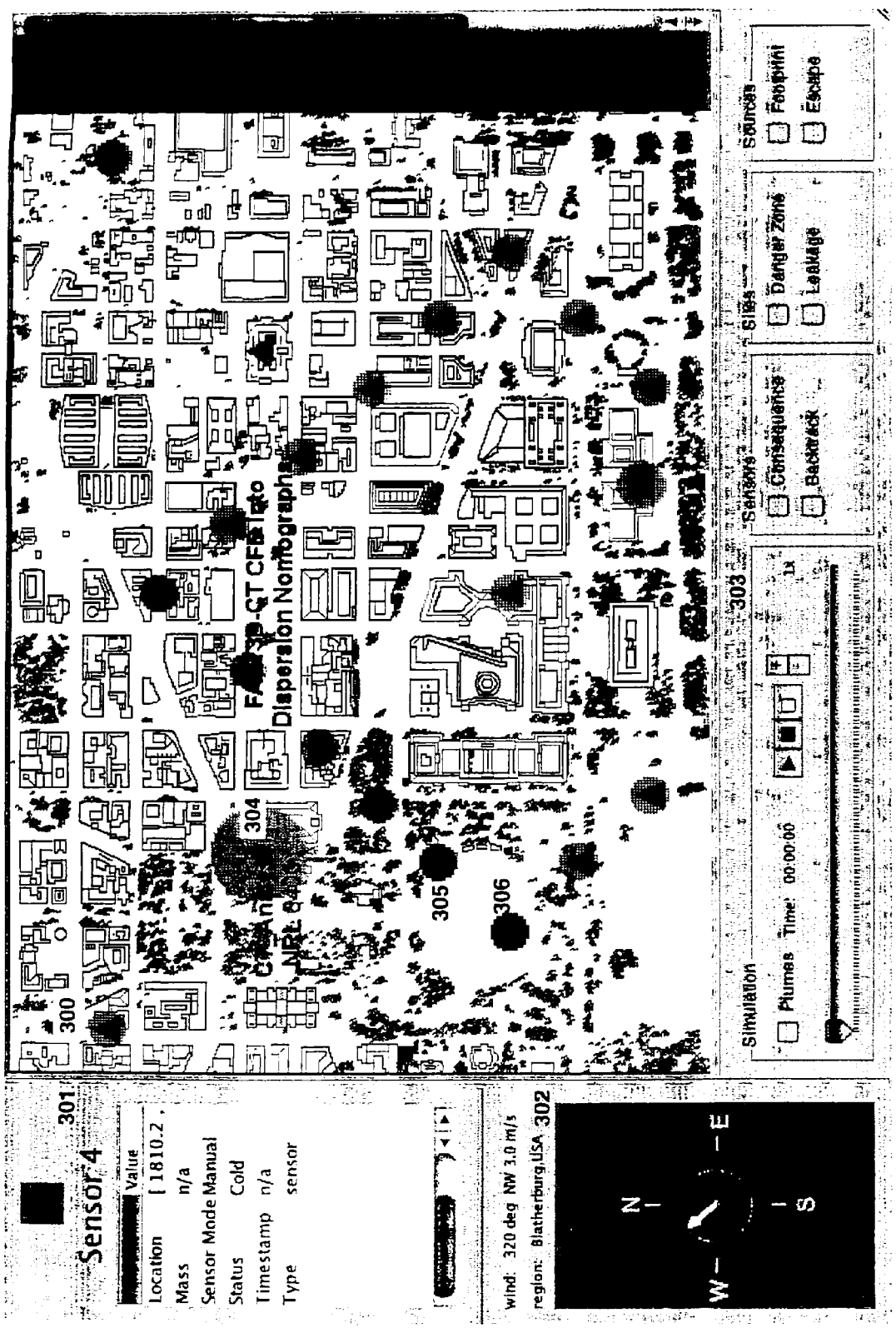
FIG. 3 is a diagram representing the components of the graphical user interface of the present invention.

As shown in FIG. 3, the user and monitor of Chemical, Biological or Radiological Attacks interacts with present invention through a graphical user interface. GUI 100 displays the SSS objects as graphical elements. GUI 100 is one of the key components of analyzer 1000, through which the user (FIG. 2, 200) interacts with analyzer 1000. The simplicity, and ease of use of GUI 100 is in stark contrast to other emergency response systems. The user has to merely point and click to manipulate properties of SSS objects, or environmental properties. The user is not required to input detailed information about the contaminant prior to obtaining a useful result. Additional information can be added as it becomes available. Because of its simplicity of use, training in the use of analyzer 1000 is minimal.

Using GUI 100, the user can add, remove, or modify the properties of the SSS objects. The various environmental properties can also be modified 302. The user may also load, and save scenarios, run simulations, and change how Nomograph Displays 106 are presented 303. GUI 100 translates Nomograph Displays 106 into a display format 300, which is viewable by the user. This includes translating Nomograph Displays 106 into the required coordinate system, adding maps, or other graphical layers (FIG. 1, 111) representing buildings, terrain features, or other relevant geographical information about the area (FIG. 1, 111), and merging the selected Nomograph Displays 106 into an image, or images.

The graphical representation of each object is dependant on some or all of its properties 304-307. For example, a source object that is included in the Nomograph generation is depicted as a star 304. Sensor objects are depicted using different colors and shapes, depending on their properties. Examples of sensor depictions are shown 305-307. For instance, a simulation sensor 305, in a hot state, which is included in the generation of Nomograph Display 106, is easily identified from a manual sensor 306, whose state is cold, which is also used in the generation of Nomograph Display 106.

GUI 100 can provide multiple views of SSS objects, or the environment object. For example, a sensor object 306 is depicted in a main GUI 300 and an auxiliary GUI 301. Main GUI 300 is used to display some information about all of the objects on the screen, as well as a presentation of Nomograph Displays 106. Auxiliary GUI 301 is used to present the properties in an object in a different, or expanded format. Auxiliary GUI 301 may display the same information as main GUI 300, but typically shows more detail about one or more SSS objects, the Environment object, or the Nomograph Options. Multiple auxiliary GUI's may be used depending on user preference. In this figure, two portions of the auxiliary display are shown, a GUI portion 302 to control the environment object's properties, and an auxiliary GUI portion 303 to control the Nomograph Options.

Figure 4:
FIG. 4 is a diagram showing the presentation of Nomograph displays generated by the Nomograph library.

FIG. 4 shows diagrams of the main Nomograph Displays 106 generated by Nomograph Library 102. This figure shows some of the unique diagnostic capabilities of analyzer 1000. For example, the Backtrack display 401 is unique to analyzer 1000 due to the use of Nomographs Library 102. The speed with which the displays are generated contribute to the usefulness of analyzer 1000.

The Nomograph tables used to generate Nomograph Displays 106 are typically selected based on the properties of the state vector, and the area of interest. The main types of Nomograph tables generated are 1) the consequence display 400, 2) the backtrack display 401, 3) the footprint display 402, 4) the simulation display 403, 5) escape display 404, 6) danger zone display 405, and 7) the leakage display 406. Nomograph Library 102 may generate specialized displays for a particular state vector, if requested.

Sensor vector states are used to generate two types of Nomograph Displays 106, consequence and backtrack displays. The consequence display 401 consists of a region downwind, with an upwind safety radius from a sensor that could potentially be exposed to a contaminant. This is dependant on the whether the sensors states are hot or cold. The Backtrack display 402 shows the probability of a contaminant source location for different regions. The Backtrack display will display regions by different values, depending on the probability that a source originated from that area.

Source vector states are used to generate simulation 403, footprint 402, and escape route 404 displays. The footprint display shows the area downwind, with an upwind safety radius that could become exposed to the contaminant from the source. The simulation display shows a time evolution of a plume. The escape display shows the optimal escape routes, based on the footprint display from the source.

Site vector states are used to generate danger zone 405, and leakage 406 displays. The danger zone display shows the area upwind from a site where a contaminant placed in that area could reach the site. The leakage display shows the area downwind of the site that could potentially be exposed to a contaminant if the site itself was exposed.

Figure 5:
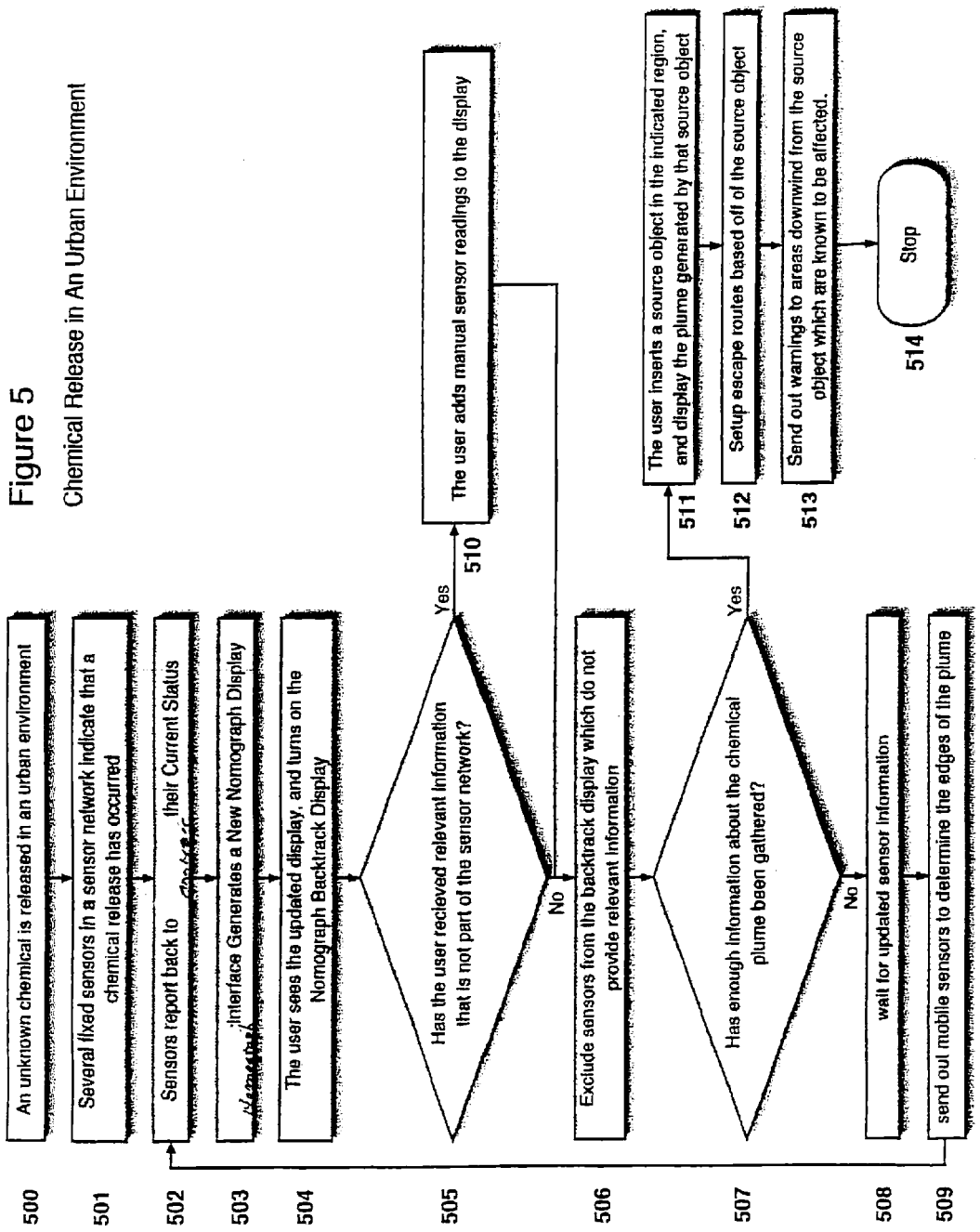
FIG. 5 is a detailed scenario using the present invention.

FIG. 5 is a block diagram detailing a user's response to information displayed by analyzer 1000. In this scenario, a chemical agent has been released in an urban environment 500. A fixed sensor net has been deployed in the urban area, and several of the sensors alarm 501 indicating that a chemical release has occurred in the area. The sensors are connected to External Interface 107, and their change in status is received 502. Nomograph Display 106 is generated 503, which is displayed by GUI 100, which also shows the change in status of the effected sensors. The user sees the change in state, and selects backtrack display 303 from GUI 100. Sensor readings can also be obtained from mobile sensors, or other sources like first responder radio reports, or people becoming ill from the chemical release. If this information exists 505, it can be entered into analyzer 1000 as a manual sensor reading 510.

If any manual sensors, or automatic sensors are hindering the ability of analyzer 1000 to limit an area where the chemical release has occurred, the user can exclude 506 the sensor readings from the backtrack. The user can now determine if they have enough information to determine where the source is located 507. If the backtrack area displayed by analyzer 1000 is not narrowed to a small region, the user has several options. They can wait for more information to come in via the fixed sensor network, or by manual sensor input 508. They can also send mobile sensors to the potential chemical source area displayed by the backtrack 509, with the goal of finding the edges of the chemical plume.

When the backtrack display from analyzer 1000 has narrowed the location of the chemical release to a small region, a source object can be placed in the backtrack region 511. With the source object displayed in analyzer 1000, the area downwind that could be contaminated by the chemical release is known. The user can now setup escape routes based on the source object 512, and send out this information out to areas downwind of the source 513. The escape route information can be sent out to remote sites via External Interface 107 of analyzer 1000, or through other methods external to analyzer 1000.

FIG. 6 is a functional block diagram showing the creation of events typically created in analyzer 1000. These events are routed through analyzer 1000 to Nomograph Interface 101 to other components in analyzer 1000. An event may affect multiple components of analyzer 1000, or none at all.

Environmental Objects usually generate events by changing environmental parameters 600, or changing the Nomograph tables used 601. Changing the environment parameters generates a metEvent 606. The environment parameters that are most frequently altered are the wind direction, and velocity 604. Other miscellaneous parameters 605 that would generate a metEvent include time of day, season, and weather conditions, and other meteorological parameters. Changing the nomograph tables used or a change in the location viewed analyzer 1000 608, will generate an areaEvent.

The two types of events that occur with Sensor, Source, or Site objects are a change in the properties of an SSS object 602, and the addition/removal of an SSS object 603. Changing a property of an SSS object 609 will generate an SSS Object Event 610. The properties that typically create an SSS Object Event include altering the objects location, the type of object it represents, whether it is included in the calculation of Nomograph Displays 106, and its state. Adding or removing an SSS Object 611 will generate an SSS Add/Remove Object Event 612.

Figure 7:
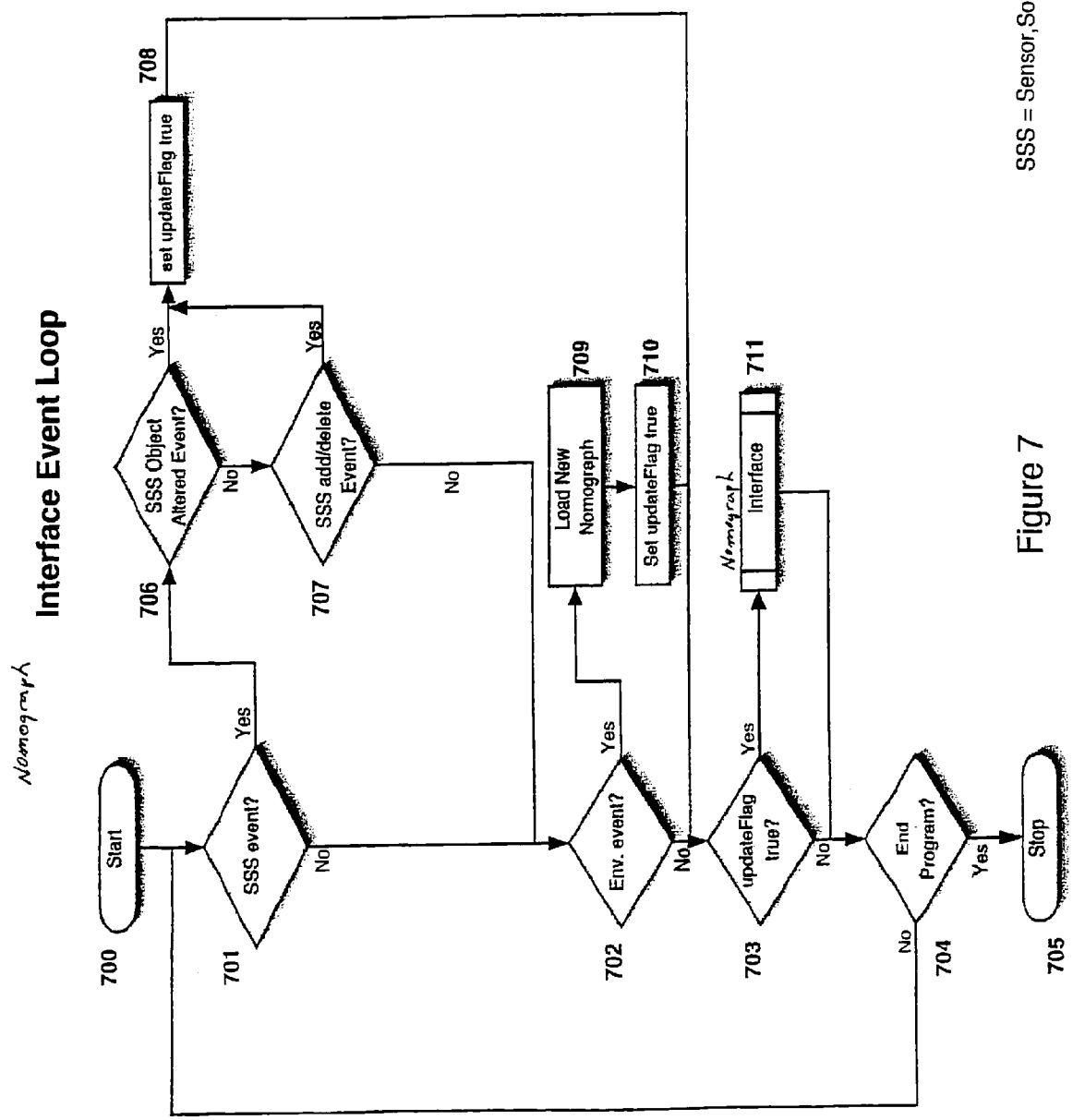
FIG. 7 shows a block diagram representing the main event loop, a component of the present invention to Nomograph Interface.

FIG. 7 is a functional block diagram of the Event Loop. This is an internal component of Nomograph Interface 101. The Event Loops is started 700 when Nomograph Interface 101 is initialized. It first checks see if any SSS events have occurred 701. If an SSS event was generated, it is checked to determined what type of event it is 706-707, and sets the updateFlag to true if the event is valid. If an environment object event has occurred 702, a new nomograph table will be loaded depending of the parameters of the Environmental object 709, and the updateFlag will be set. If the updateFlag has been set 703, the NG Interface will be called 711, which will update Nomograph Displays 106. If the program hasn't finished, it will continuously process this loop 704, otherwise the loop will exit 705.

Figure 8:
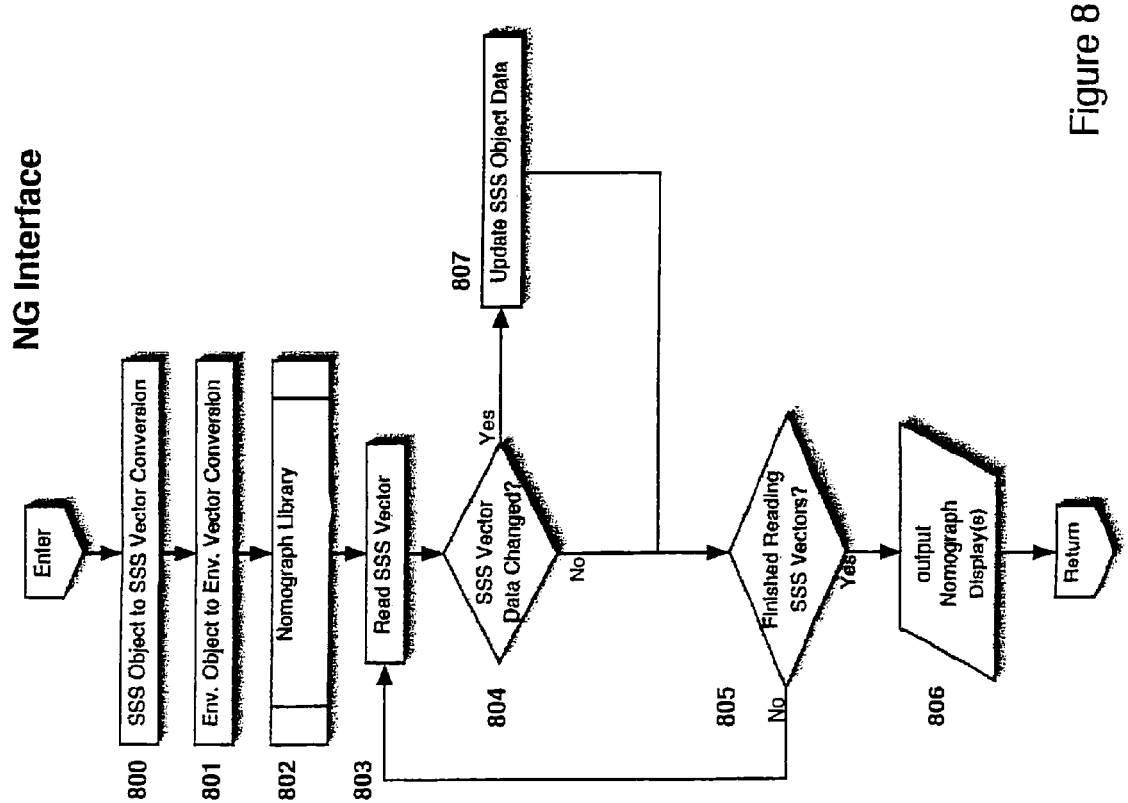
FIG. 8 is a functional block diagram of the interface used to communicate with the Nomograph libraries, a component of the present invention to Nomograph Interface.

FIG. 8 is a functional block diagram of the NG Interface. This is an internal component of Nomograph Interface 101, which translates the SSS objects, and Environmental objects into the format that Nomograph Library 102 can use, and outputs updated SSS objects, and updated Nomograph Displays 106.

First, the SSS objects, and the Environmental object are converted into their state vector equivalent 800-801. Next, Nomograph Library 102 is called, and new Nomograph Displays 106 are generated 802. Since Nomograph Library 102 can potentially alter the state vectors, each vector is checked to see if it has been altered 803-805. If it has been altered, the SSS object and SSS vector are reconciled by updating the properties of the SSS object using the properties from the state vector 807. New Nomograph Displays 106 are sent out to the other components of analyzer 1000 806, and the NG Interface returns.

To maximize accuracy and speed in assessing an environmental threat or airborne CBR threat within a domain, e.g., a city, the city should be saturated with sensors. Such a system may be impractical with respect to financial budgets and data management. Therefore, it is a goal to optimize sensor placement based on a usable number of sensors that fit a particular financial budget and data management system. To find an optimal sensor network, a genetic algorithm using features of the present invention provides this ability.

Since its development in the 1960's, the genetic algorithm has been used successfully in many different fields. Genetic algorithms are a type of search algorithm that works particularly well if the search space is too large to run every potential case and when local maxima exist. For example, to exhaustively search every possible location of a group of 20 sensors in a grid of 350×350 potential locations at a rate of 20 evaluations per second would take months if not years. While the answer generated by a genetic algorithm might not be the best solution, it will typically be a very close approximation to it. The main disadvantage of genetic algorithms is that they potentially require a lot of time and computing resources, depending on the rate of convergence and the computational cost of a fitness function. However, given the amount of time required to evaluate a typical population, many examples of parallelized genetic algorithms exist.

A genetic algorithm evaluates the fitness of genomes in a population, and generates the next population based on the fitness of the previous generation. Each genome is a potential solution to the problem, where the elements of the solution are equivalent to chromosomes in the genome. The initial population is usually chosen randomly, but the initial population can also be seeded with solutions that are known to produce good results. The next population of genomes is determined by combining members of the current population to produce offspring that are based on the scores of each parent genome's fitness function. This is known as crossover. During crossover, individual chromosomes within the offspring can potentially mutate, giving the offspring slightly different characteristics that are unique from its parents. This is particularly useful in later generations of the population, where the population is fairly homogeneous. The user determines the fitness function of a genome, in which the performance of a genome is evaluated, and a fitness score is assigned. Members with a high fitness score will typically have many offspring in the next generation while those with a low fitness score could have few or none. New populations are generated, and evaluated until one of several requirements is met. This includes the desired fitness level of a member of the population, the average fitness of the population has reached some level, or the maximum number of generations has been calculated.

An approach using genetic algorithms was selected for sensor optimization because the characteristics making up a robust sensor network were largely unknown. This approach also made it easy to modify specific characteristics while leaving the search method intact. Furthermore, advances in contaminant transport modeling made it possible for this search technique to be utilized.

The use of computational fluid dynamics models or Gaussian plume models are not suitable for use as the fitness evaluation of a genetic algorithm due to their relatively long times to generate plumes, and the sheer number (many millions) of fitness evaluations and iterations required for a solution to converge. Even if the time to generate a Gaussian plume decreased significantly, the plumes generated would not take into account the 3 D geometry of an urban region. The plume capability of analyzer 1000 is well-suited for this type of evaluation because it produces plumes comparable to the computational fluid dynamics calculation as stated above while producing this result in about one millionth of the time. The speed of analyzer 1000 allows fitness functions to be evaluated for performance quickly. Table 1 shows the approximate amount of time required to run a genetic algorithm for 1000 generations using various plume models.

TABLE 1

| Plume model | Computer | Approximate time to run a fitness evaluation for 1000 generations (population = 1000) |
|---|---|---|
| CFD(FAST3D-CT) | Supercomputer | ~9000 hours (random sources) |
| Gaussian | Workstation | ~500 hours (random sources) |
| Present Invention | Laptop | ~33 hours (random sources) |
| Present Invention | Laptop | ~4 hours (time dependent sensor coverage, 20 sensors) |

A genetic algorithm has been used where the members of the population with the highest fitness scores were kept in the next population. This ensures that the population's maximum fitness score will not decrease and also reduces the number of generations required to converge to an answer. The rate of crossover was set at 0.95 with the rate of mutation set at 0.25 percent, where the mutation increased if the rate of convergence decreased by a threshold. In one example, the genome was the set of locations of the sensors in the sensor network with the chromosomes consisting of (x, y) coordinates of the sensors. The population size was set to 1000. While the individual fitness function is now relatively fast, the algorithm was distributed over multiple processors using a message passing interface. The evaluations of the population are spread out over multiple processors, with the best results of a generation saved as candidates for the solution. This algorithm is computer bound so a high-speed interconnect is not necessary. Several different approaches were examined for the fitness function.

The first approach uses a plume model to generate plumes from randomly placed sources and then analyzes the sensor network's ability to detect the plume within time t of release. In this case, if a least one sensor is located within the plume, it counts as a detection of the plume. The sensor network individually evaluates a sequence of randomly located sources, with the fitness score based on the total number of sources detected. A new set of random sources must be calculated for each generation. If the set of source locations is fixed, the sensor network's solution would converge on the coverage of that set of fixed sources, but not on a optimal coverage of sources located anywhere in the region. This method has the advantage of being able to use a variety of plume prediction tools like Gaussian plume models, computational fluid dynamics models (e.g. FAST3D-CT), and Dispersion Nomograph tools (e.g. analyzer 1000). However analyzer 1000 is the best choice due to its speed and accuracy (Table 1, lines 1-3).

Figure 9A:
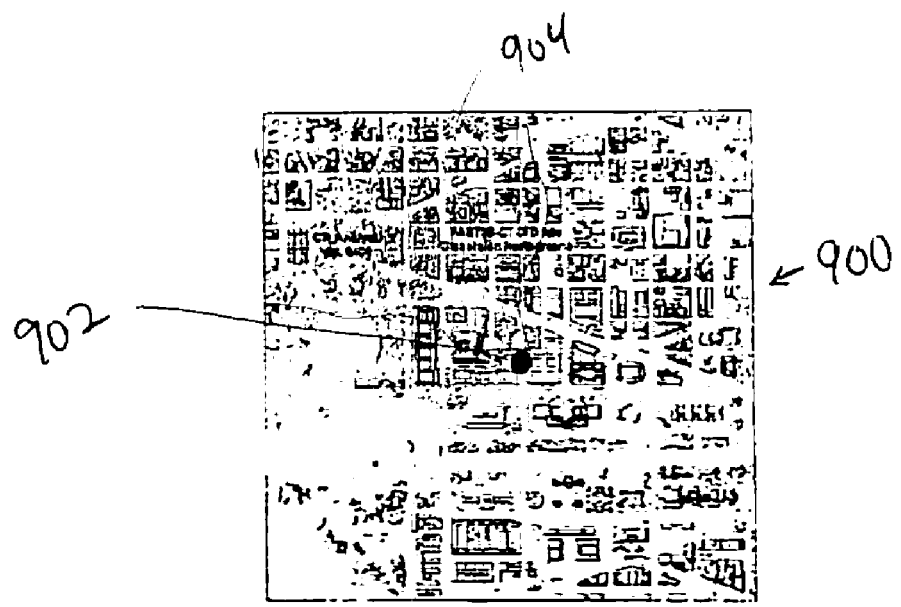
FIG. 9a is an exemplary Nomograph display of the upwind danger zone in accordance with the present invention.
Figure 9B:
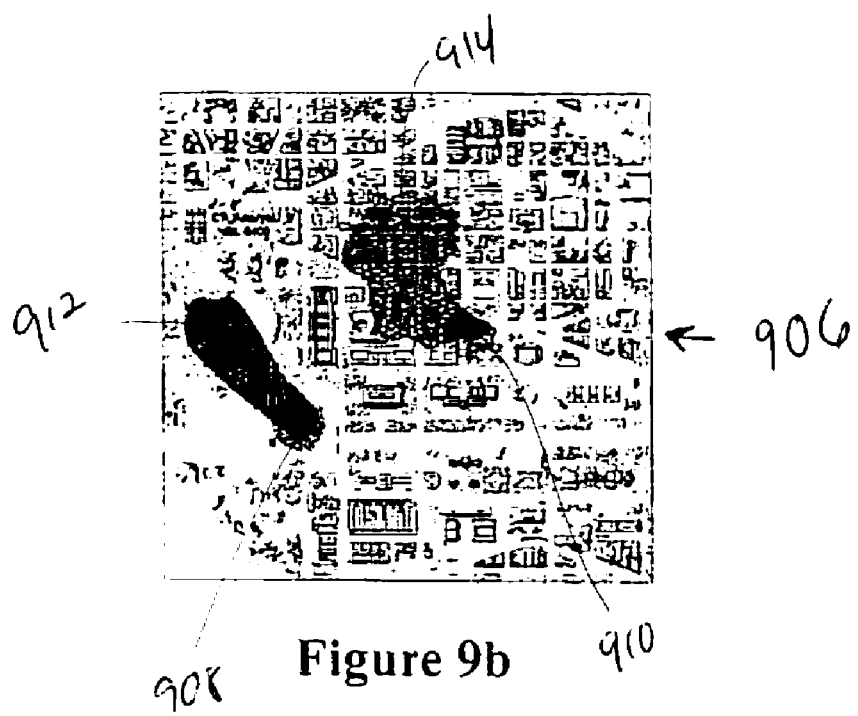
FIG. 9b is another exemplary Nomograph display of the upwind danger zone in accordance with the present invention.

While this approach is acceptable, a much more efficient procedure was developed using the unique upwind capability of analyzer 1000. FIG. 9a is an exemplary Nomograph display 900 of the upwind danger zone in accordance with the present invention. In the figure, display 900 of a portion of a city, i.e., the domain, includes buildings, roads and trees. Display 900 additionally includes a site 902 of a sensor. The corresponding upwind zone 904 for the sensor at site 902 represents the upwind area where the contaminant from a source could hit the sensor. This upwind, probable source zone or "backtrack" zone is time-dependent and can also be described as an "anti-plume". Sensor coverage is the union of the "anti-plumes" for all of the sensors in the region. FIG. 9b illustrates this updated display. Specifically, FIG. 9b is an exemplary Nomograph display 906 of the upwind danger zone in accordance with the present invention. In the figure, display 906 is of the same portion of the city as display 900. Display 906 additionally includes a site 908 of a first sensor and a site 910 of a second sensor. The corresponding upwind zone 912 for the sensor at site 908 represents the upwind area where the contaminant from a first source could hit the first sensor, whereas the corresponding upwind zone 914 for the sensor at site 910 represents the upwind area where the contaminant from a second source could hit the second sensor. Using the union of anti-plumes as the fitness function decreases the time to evaluate a sensor network for a region drastically (see Table 1, line 4). The new fitness function is now the total area of sensor coverage for a given region ranging from zero to one, which could be calculated with a single call to analyzer 1000.

Because of the increase in efficiency, the second approach was selected for the main optimization trials. To determine the optimal amount of sensors required for this region, sensor networks from five to forty sensors, in five sensor number increments were evaluated for total sensor coverage on a 2 km by 2 km region for a typical city. The wind was from the northwest, with a speed of three meters per second. The region itself is an urban area with varying degrees of building density ranging from open areas free of structures to city blocks with high building density. A dispersion nomograph utilized for this region was generated using FAST3D-CT, which includes all of the effects of buildings, streets, trees, etc. Analyzer 1000 is used to evaluate sensor configurations for a detection delay of three minutes, six minutes, and nine minutes. These times were selected based on results obtained from the walk away program. Nine minutes warning delay has been found to be maximum delay to be tolerated if at least 50% of a population in an area affected by a moderately large plume is to be saved.

Figure 10:
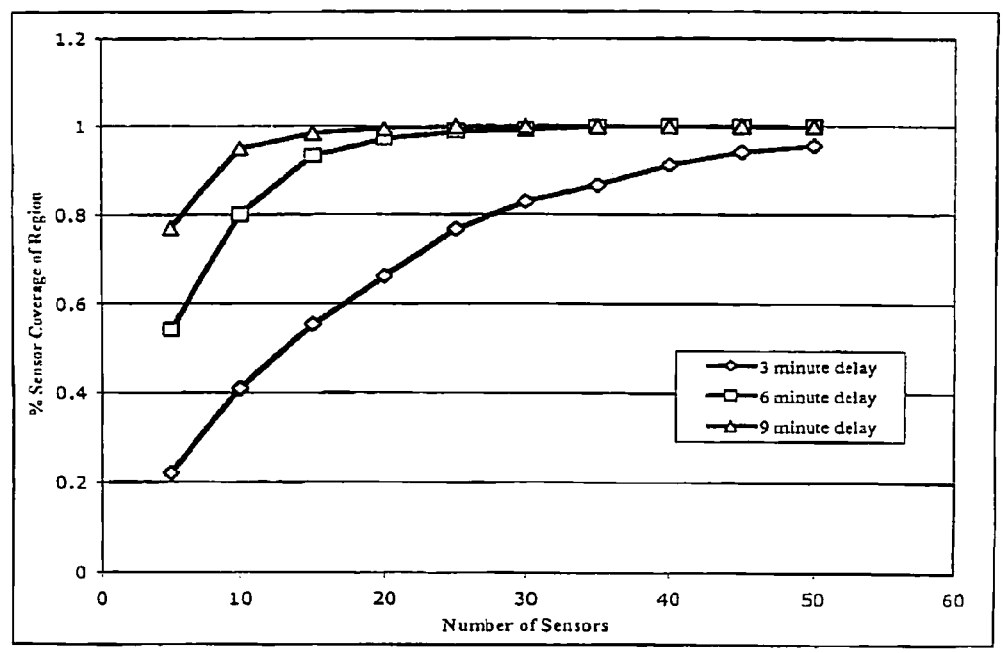
FIG. 10 is a graph showing the fractional area covered versus number of sensors for detection delay of three, six, and nine minutes in accordance with the present invention.

FIG. 10 shows the fractional area covered versus number of sensors for detection delay of three, six, and nine minutes. The number of sensors required producing adequate coverage increases significantly as the plumes size decreases. Only 10 to 15 sensors are required to obtain 90% coverage for a nine-minute time delay, contrasted with over 40 for a three-minute detection delay. Even with 50 sensors, complete coverage of the region cannot be obtained for the three-minute delay while additional sensors became completely redundant past 30 sensors for these six- and nine-minute warnings.

Figure 11A:
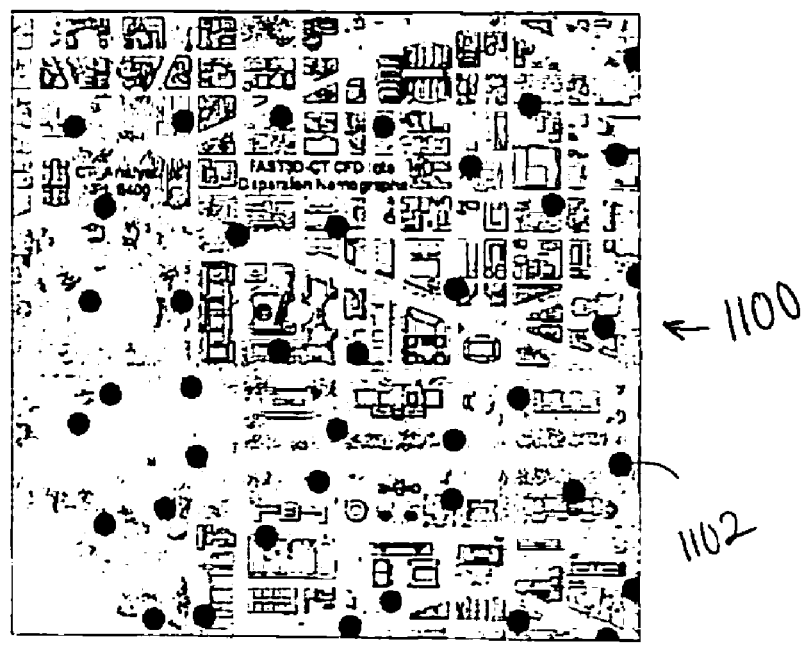
FIG. 11a is an exemplary Nomograph display showing 40 sensors within a domain in accordance with the present invention.
Figure 11B:
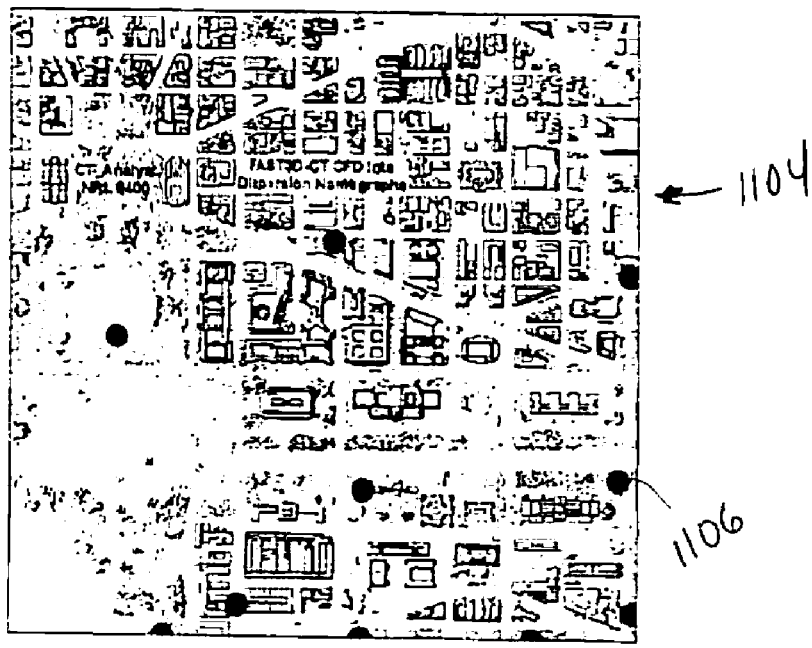
FIG. 11b is an exemplary Nomograph display showing 10 sensors within a domain in accordance with the present invention.

FIGS. 11a and 11b are exemplary Nomograph displays 1100 and 1104, respectively, of the same portion of the city as display 900. FIGS. 11a and 11b represent the minimal sensor network required to detect at least 90% of the region for three- and nine-minute detection delays. For a nine-minute delay (FIG. 11b), sensors are placed at sites 1106 towards the edge of the region, opposite of the wind direction because at nine minutes the "anti-plumes" are very large, and sensors are wasted if they are placed further upwind. If the time delay for detecting a plume is increased beyond nine minutes, the eventual result is a sensor network with all of the sensors placed along the edge of the domain. 40 sensors are required To provide the same coverage for a three-minute detection delay, 40 sensors at sites 1102 must be provided as illustrates in FIG. 11a. The density of sensors for a given area in the region varied. More sensors were required for relatively open areas and where the plume funneled through gaps between buildings. This was particularly noticeable when the time delay allowed for detecting plumes was short.

Figure 12A:
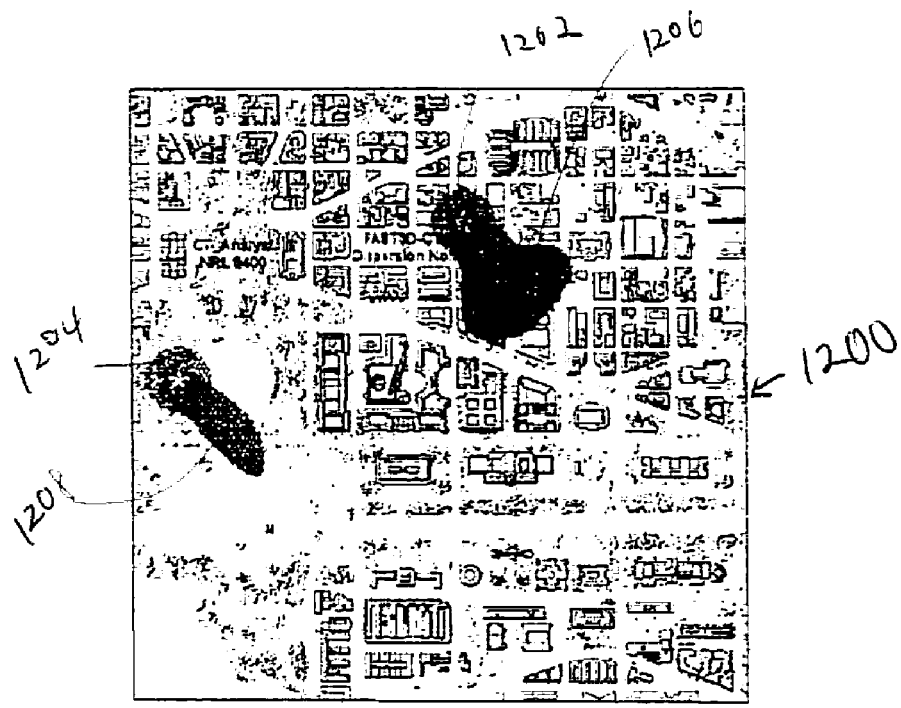
FIGS. 12a and 12b are exemplary Nomograph displays showing plume envelopes for the release of two sources within a domain in accordance with the present invention.
Figure 12B:
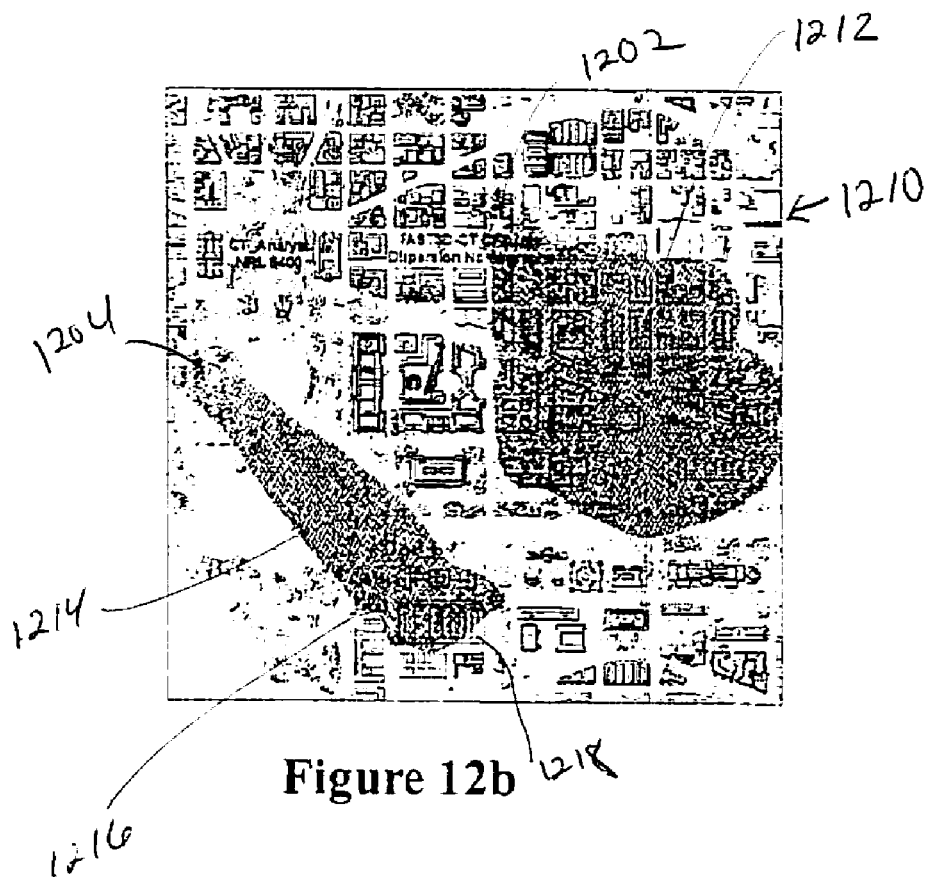

The shape of the plume envelope can explain this result. In areas with few buildings, the plume envelopes are narrow and elongated, looking very much like their Gaussian plume counterparts. In areas with many buildings, the shape of the plume envelope is broader, depending on the geometry of the buildings and wind angle. FIGS. 12a and 12b are exemplary Nomograph displays 1200 and 1210, respectively, of the same portion of the city as display 900. FIGS. 12a and 12b depict plume envelopes for the release of two sources at sites 1202 and 1204, respectively, in the domain after three and after nine minutes. The first source is released at site 1202, which is in an open region, while the second source is released at site 1204, which is in an area with high building density. Note that a plume 1208 illustrated in FIG. 12a develops into plume 1214 in FIG. 12b, whereas plume 1206 illustrated in FIG. 12a develops into plume 1212 in FIG. 12b. Plume 1214 has a shape that starts to change at point 1216 as it encounters a city block with high building density 1218. In order to detect a narrow plume more sensors are required.

Figure 13:
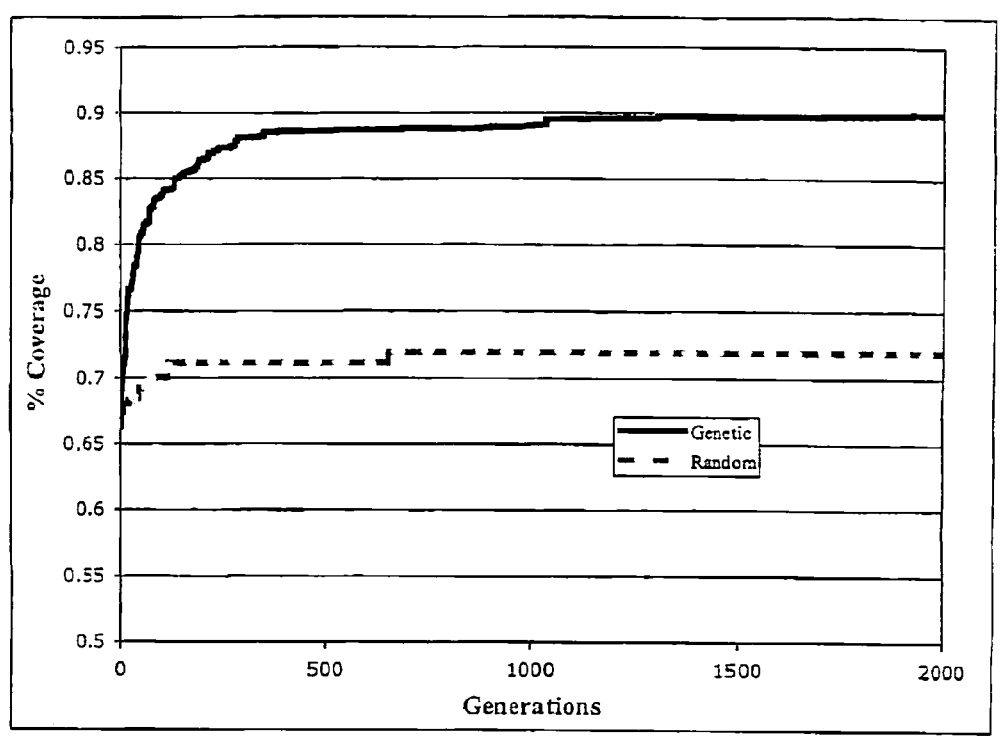
FIG. 13 is a graph depicting the coverage of the sensor network versus a random sensor placement run for the same number of intervals in accordance with the present invention.

FIG. 13 is a graph that shows the coverage of the sensor network versus a random sensor placement run for the same number of intervals. The random (brute force) sensor placement is evaluated in the same manner as the genetic algorithm with the best candidate produced of each generation reported as the maximum coverage attained. For the same amount of effort, here two million calls to analyzer 1000, the generic algorithm covered over 90% of the region while the random-placement approach's best answer results in coverage of about 72% of the region.

The use of a genetic algorithm to produce a plausible and useful sensor optimization has been shown. This approach was not possible until the low-latency evaluation of contaminated regions of analyzer 1000 was developed. To calculate 1000 generations requires 1 million calls to analyzer 1000 and many millions of individual sensor backtrack "anti-plume" evaluations. With more complex fitness functions, and more stringent requirements for a sensor network, the time to calculate an optimal network will only increase. Use of other plume models is prohibitive. This approach is one technique for determining the optimal sensor placement. It has also shown that to provide guaranteed short detection delays will require many sensors.

Although this invention has been described in relation to an exemplary embodiment thereof, it will be understood by those skilled in the art that still other variations and modifications can be affected in the preferred embodiment without detracting from the scope and spirit of the invention as described in the claims.

What is claimed is:

1. A system for use with a plurality of sensors within a domain for predictively modeling dispersion of a material through a medium within the domain, said system comprising:
   a storage portion having stored therein nomograph data;
   a processing portion operable to process the nomograph data;
   a graphical user interface connected to said processing portion; and
   an external interface connected to said processing portion and in communication with location data providers that are operable to provide to said processing portion, via said external interface, location data related to a location of an event corresponding to a presence of the material within the domain,
   wherein the nomograph data relates to domain data that corresponds to data of the domain and relates to medium data that corresponds to data of the medium within the domain,
   wherein said processing portion is further operable to process the location data and to provide, to said graphical user interface, display data relating to the nomograph data and the location data,
   wherein said graphical user interface is operable to display the display data to predictively represent possible dispersion of the material through the medium within the domain, and
   wherein said processing portion has an executable genetic algorithm stored therein that is operable to determine placement of the sensors to minimize detection time of dispersion of the material through the medium within the domain.

2. The system of claim 1, wherein the medium data includes atmospheric data.

3. The system of claim 1, wherein the display data includes data corresponding to the location of sensors and data corresponding to the location of sources of the material.

4. The system of claim 1, wherein the data of the domain includes regional geographic data.

5. The system of claim 1, wherein said external interface is further in communication with environmental data providers that are operable to provide to said processing portion, via said external interface, property data that corresponds to data of temperature, speed and direction of the medium within the domain.

6. The system of claim 5, wherein the nomograph data includes a plurality of nomograph data sets, and
   wherein each nomograph data set corresponds to a specific speed and specific direction of the medium within the domain.

7. The system of claim 6, wherein the graphical user interface is further operable to enable the user to instruct said processing portion to change the display data, provided to said graphical user interface, from a first display data relating to a first nomograph data set corresponding to a first speed and first direction of the medium within the domain to a second display data relating to a second nomograph data set corresponding to a second speed and second direction of the medium within the domain,
   wherein said processing portion is further operable to process the location data and to provide, to said graphical user interface, the second display data, and
   wherein said graphical user interface is further operable to display the second display data to predictively represent possible dispersion of the material through the medium within the domain based on the second speed and second direction of the medium within the domain.

8. The system of claim 7, wherein the graphical user interface is further operable to provide to said processing portion the location data,
   wherein said graphical user interface is further operable to instruct said processing portion to change the location data from a first location data corresponding to a first location within the domain to a second location data corresponding to a second location within the domain,
   wherein said processing portion is further operable to process the second location data and to provide, to said graphical user interface, the second display data relating to the second nomograph data set and the second location data, and
   wherein said graphical user interface is operable to display the second display data to predictively represent possible dispersion of the material through the medium within the domain.

9. The system of claim 1, wherein the graphical user interface is further operable to provide to said processing portion the location data,
   wherein said graphical user interface is further operable to instruct said processing portion to change the location data from a first location data corresponding to a first location within the domain to a second location data corresponding to a second location within the domain,
   wherein said processing portion is further operable to process the second location data and to provide, to said graphical user interface, second display data relating to the nomograph data and the second location data, and
   wherein said graphical user interface is operable to display the second display data to predictively represent possible dispersion of the material through the medium within the domain.

* * * * *